United States Patent

Takehisa et al.

[15] 3,646,950
[45] Mar. 7, 1972

[54] METHOD OF REDUCING PRESSURE AND CONTROLLING FLOW RATE OF A FLUID UNDER HIGH PRESSURE

[72] Inventors: Masaaki Takehisa; Waichiro Kawakami; Hayato Nakajima, all of Takasaki-shi; Yoshihiko Hosaki, Yokohama-shi, all of Japan

[73] Assignee: Japan Atomic Energy Research Institute, Tokyo, Japan

[22] Filed: Apr. 1, 1969

[21] Appl. No.: 812,247

[30] Foreign Application Priority Data

Apr. 12, 1968 Japan.....................43/24010

[52] U.S. Cl............................137/13, 137/14, 62/48
[51] Int. Cl...........................................F17d 1/16

[58] Field of Search....................137/13, 14; 62/48

[56] References Cited

UNITED STATES PATENTS

| 3,006,354 | 10/1961 | Sommer et al.............................137/13 |
| 3,092,981 | 6/1963 | Begeman et al........................62/48 X |
| 3,389,714 | 6/1968 | Hughes et al. ..........................137/13 |

*Primary Examiner*—Robert G. Nilson
*Attorney*—Kurt Kelman

[57] ABSTRACT

The pressure of a fluid under high pressure can be reduced as the flow rate of said fluid is kept at an arbitrarily selected value by passing said fluid through a circuit comprising a long tubing or a reduction nozzle or series of nozzles and introducing a flow rate controlling medium into said circuit.

16 Claims, 1 Drawing Figure

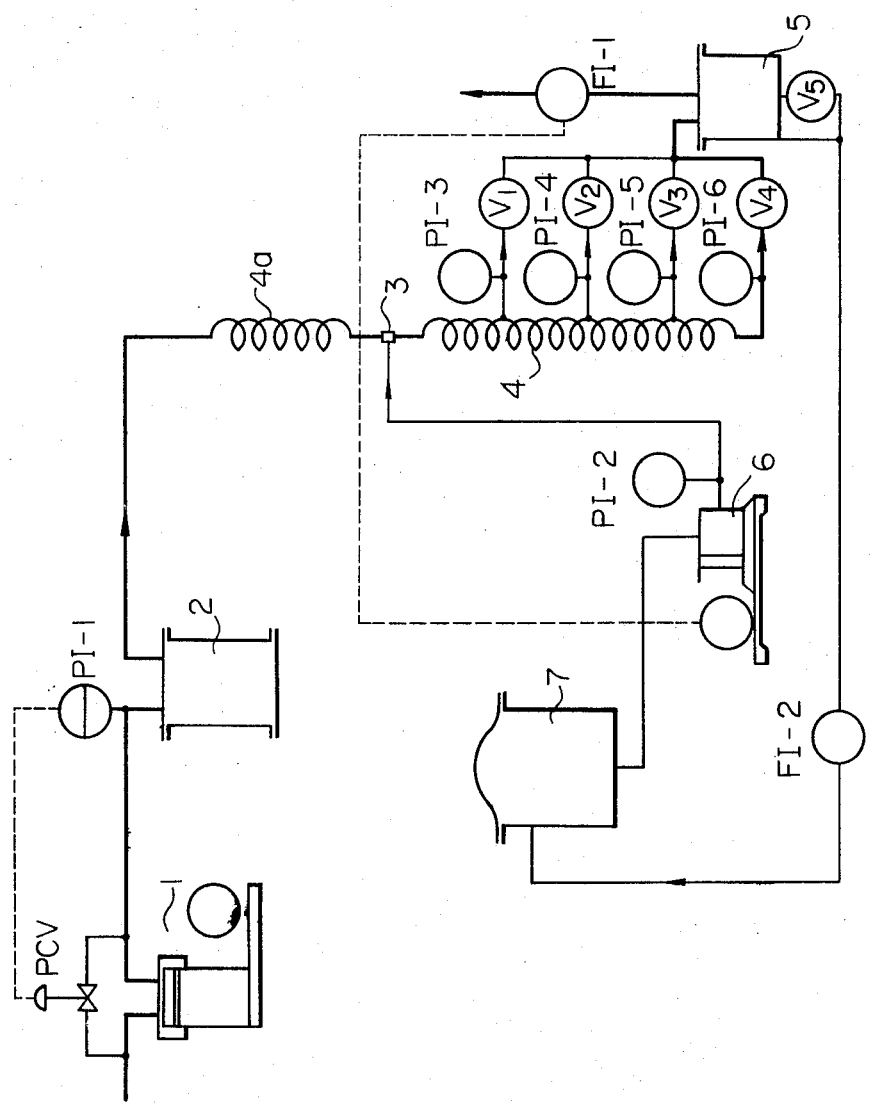

1

METHOD OF REDUCING PRESSURE AND CONTROLLING FLOW RATE OF A FLUID UNDER HIGH PRESSURE

BACKGROUND OF THE INVENTION

This invention relates to a method for reducing the pressure of a fluid, including gas, liquid and slurry under high pressure and precisely controlling its flow rate at a predetermined value in a high-pressure apparatus.

It is often necessary to reduce the pressure of a fluid under high pressure and to hold its flow rate constant, for instance, when a fluid containing a reaction product is taken out of a high-pressure reaction vessel. It is however, very difficult to do this, and this problem has not been technically solved until now. As the means for reducing the pressure of a high-pressure fluid, methods using reducing valves or long tubing have been employed. However, the operation of valves is difficult; and when dust or solid foreign materials are in the fluid, when a slurry is to be treated, or !hen the fluid is a gas which is easily liquefied or solidified upon pressure reduction such as ethylene or carbon dioxide, pressure reduction by the use of a reducing valve is almost impossible. Further, when solid foreign materials are in the fluid, not only is the life of the valve shortened owing to abrasion, but pressure reduction itself is extremely difficult. On the other hand, when long tubing is used, the relation between pressure and flow rate is definitely determined for a given diameter and length of the tubing, since the pressure of the flowing fluid is reduced by friction resistance when the fluid flows inside the tubing. Therefore, in methods using long tubing, the flow rate and pressure can not be arbitrarily varied.

The purpose of this invention is to provide a novel method for pressure reduction and flow-rate control of a fluid under high pressure, in which the above-mentioned defects of the prior art have been eliminated.

SUMMARY OF THE INVENTION

In this invention precise control of the pressure and the flow rate of a high-pressure fluid is achieved by passing the high-pressure fluid (including slurry) through a long tubing or a circuit containing reducing nozzles (hereinafter called "pressure reduction circuit"), introducing a flow rate controlling medium into the circuit at the midpoint thereof, and regulating the amount of medium supplied. The flow rate controlling medium (hereinafter simply called "medium") is generally a liquid which is immiscible with the fluid the pressure of which is to be reduced. But a liquid which is miscible with the fluid can also be used if the liquid or medium can be separated from the fluid afterward or if it is unnecessary to separate the medium from the fluid.

The method of this invention can be applied to pressure reduction and flow rate control of a fluid under high pressure which comprises a gas, a liquid, a gas and liquid mixture, two or more immiscible liquids, a slurry, or a gas, liquid and solid mixture.

That is to say, this invention provides a method for pressure reduction and fluid flow rate control in a high-pressure fluid system selected from a gaseous phase system, a liquid phase system, a gas-liquid two-phase system, slurry, a system comprising two or more immiscible liquids, or a gas-liquid-solid system. It comprises passing said fluid through a pressure-reduction circuit comprising a long tubing or a reduction nozzle or a series of nozzles, introducing a flow rate controlling medium into said pressure-reduction circuit, and regulating the flow rate of the medium.

The method of this invention is advantageously utilized in cases in which polymerization is carried out in a high-pressure gaseous or liquid phase and the polymerization product has to be continuously taken out of the high-pressure reactor to the ambient space. The invention is now explained in detail, the attached drawing being referred to.

BRIEF EXPLANATION OF THE DRAWING

The sole FIGURE is a schematic diagram representing an apparatus used in an embodiment of this invention. In this drawing, V stands for valve, PI stands for pressure indicator, and FI stands for flow rate indicator.

DETAILED EXPLANATION OF THE INVENTION

In the apparatus schematically shown in the drawing, a fluid, that is, a gas, a liquid, a gas-liquid mixture, a slurry (the dispersed solids may be a reaction product produced in a high pressure reactor), a mixture of two or more immiscible liquids, or a gas-liquid-solid system, is pressurized to a predetermined pressure by means of a diaphragm-type two-step compressor 1 having a maximum compressing pressure of 400 kg./cm.$^2$ and a maximum flow rate of 10 m.$^3$(at a temperature of 0° C. and at atmospheric pressure/hr. and is charged into high-pressure vessel 2 having a volume of 7 liters designed for a normal operating pressure of 400 kg./cm.$^2$. The pressure inside this system is maintained constant by means of pneumatic control valve (PCV) which is commercially available. In order to reduce the pressure of the fluid as it flows at a predetermined rate, a flow rate controlling medium is introduced into the pressure reduction circuit at mixing port 3 by means of plunger pump 6, which has a capacity of 400 kg./cm.$^2$ at the maximum delivery pressure and 100 liter (NTP)/hr. at the maximum flow rate, so that the fluid and the medium may flow together in the circuit. The pressure reduction circuit is a long tubing of 1–5 mm. inside diameter. Plunger pump 6 is a commercially available flow-rate-variable one equipped with stepless variator. Member 7 is a storage tank for the flow rate controlling medium. The pressure at which said controlling medium is introduced must be at least the same as or somewhat higher than that inside the high-pressure circuit so as to prevent backflow from the pressure-reduction circuit. Alternatively, a preliminary pressure-reducing means represented by 4a may be provided upstream of the circuit, and the medium may be introduced into the fluid after the pressure has been reduced a little. Otherwise, a check valve may be provided at the inlet of the mixing port 3. The mixture of high-pressure fluid and flow rate controlling medium is passed through pressure-reduction circuit 4 whereby its pressure is reduced. The design of the pressure reduction circuit and all the above-mentioned system can be easily worked out by the skilled in the art by considering the purpose of the pressure reduction. For instance, when the pressure to be reduced is that of a gas that is easily liquefied or solidified, such as ethylene or carbon dioxide, the pressure drop should be kept low enough to insure that the gas will not solidify. In this case, if the pressure is reduced substantially in the preliminary pressure-reduction circuit 4a, then relatively little reduction is required in the reduction circuit 4 and less energy will be consumed by pump 6. When the pressure of a slurry is reduced, in order to prevent the hazard of clogging the best policy is to employ a thin slurry and it is desirable to reduce the pressure as little as possible in the preliminary reduction circuit 4a.

Design, dimension and materials of the pressure-reduction circuit is determined case by case by considering the properties and flow rate of the fluid the pressure of which is to be reduced, the properties of the flow rate controlling medium, the capacity of the plunger pump 6 and the pressure difference (absolute value of pressure reduction).

The flow rate of a high-pressure fluid may be increased or decreased by decreasing or increasing the amount of the medium to be introduced into the pressure-reduction circuit per unit time. If varied degrees of pressure reduction are to be obtained, varied reduced pressures indicated by pressure indicators PI-3, 4, 5 and 6 are achieved by taking out the fluid from respectively corresponding portions in the reduction circuit as indicated in the drawing.

When the fluid the pressure of which is to be reduced, is a gas, for example, and a liquid is used as the flow rate controlling medium, the gas and liquid are separated in separating tank 5. If the flow rate of the separated gas is checked by flow rate indicator FI-1 and the reading of the indicator is fed back to pump 6, the flow rate of the fluid (gas) can be automatically controlled.

If for some reason it is necessary to keep the inside of separator 5 at a superatmospheric pressure, it is, of course, possible to reduce the pressure of the fluid to the superatmospheric pressure.

Now the invention will be illustrated by way of the preferred embodiments or working examples. It is to be understood, however, that the scope of the invention is not restricted to these embodiments only.

EXAMPLE 1

Pressure-reduction and flow rate control of nitrogen.

An experiment on pressure-reduction and flow rate control of nitrogen was carried out using an apparatus in accordance with the invention as represented by the attached drawing. The result is shown in Table 1.

Water was used as the flow rate controlling medium. By varying the amount of the water introduced into the circuit from 30 to 100 liters/hr., the flow rate of nitrogen was controlled between 10–0 m.$^3$(NTP)/hr., as its pressure was reduced. As the pressure-reduction circuit, a stainless steel tubing of 2 mm. inside diameter and 90 m. length was used.

EXAMPLE 2

Pressure reduction and flow rate control of ethylene.

It is impossible to reduce the pressure of ethylene by a valve because ethylene liquefies by rapid temperature drop upon adiabatic expansion.

By using the apparatus represented by the drawing in accordance with this invention, pressure reduction and flow rate control was carried out. The result is shown in Table 2. A stainless steel tubing of 2 mm. inside diameter and 85 m. length was used as the pressure reduction circuit, a stainless steel tube of 2 mm. inside diameter and 20 m. length as the preliminary reduction circuit 4a, and methanol was used as the flow-rate-controlling medium. Ethylene dissolves in methanol under pressure. But when the pressure is removed, the ethylene is substantially separated from methanol, only a small amount (about 1 percent by weight) of ethylene remains dissolved in the methanol.

By varying the amount of the medium introduced into the pressure-reduction circuit, a wide range of pressure reduction and flow rate of ethylene were achieved.

EXAMPLE 3

Pressure reduction and flow rate control of carbon dioxide.

When the pressure of gaseous carbon dioxide is to be reduced by means of valves, the flow rate being kept constant, dry ice forms and clogs the nozzle or tube and thus pressure reduction is impossible.

Pressure-reduction and flow rate control of high-pressure carbon dioxide was carried out using the same apparatus as used in Example 2. The flow rate control conditions were the same as in Example 2. The result is shown in Table 4. Carbon dioxide dissolves in methanol. But it is easily separated from the solvent in the same way as in Example 2.

Pressure and flow rate can be controlled over a wide range.

EXAMPLE 4

Pressure reduction and flow rate control of ethylene-polyethylene slurry.

In the apparatus of the attached drawing, an autoclave having a capacity of 500 ml. equipped with an agitator was installed as the high-pressure vessel 2. Six grams of polyethylene powder the particle size of which is about 100 mesh (ASTM) was put in the autoclave and more ethylene was charged therein until the inside pressure reached 400 kg./cm.$^2$. The polyethylene powder existed dispersed in the liquefied ethylene in the autoclave and its concentration in the slurry was about 3 percent by weight. Methanol as the flow rate controlling medium was introduced at a rate of 1.5 liter/min. (indicated by FI-2) by means of pump 6. Thus all the polyethylene powder in the autoclave could be recovered at atmospheric pressure without any loss.

In this case, there was no preliminary reduction circuit; the pressure reduction circuit was a long stainless steel tubing of 2 mm. inside diameter and 85 m. length. The flow rate of ethylene was 5 m.$^3$(NTP)/hr. (indicated by FI-1). It is impossible to reduce the pressure of a slurry like this using an ordinary needle valve or stop valve.

The used methanol was separated from ethylene in separator 5. The separated methanol contained about 1 percent by weight of ethylene at atmospheric pressure and was recirculated to storage 7 to be used as the flow rate controlling medium again.

EXAMPLE 5

Pressure-reduction and flow rate control of a slurry comprising ethylene, methanol and polyethylene powder.

The apparatus represented by the attached drawing was used instead of the high-pressure vessel (2), and a reactor for producing polyethylene was installed. A reaction system comprising a mixture of ethylene and methanol (50:50 by weight) in the liquid state was continuously supplied into the reactor. The reactor was placed in an irradiation zone of a cobalt-60 of $10^5$ Curies. Such irradiation apparatus is well known to those who are skilled in the art.

The reaction mixture (ethylene-methanol mixture) was continuously supplied into the reactor so as to maintain the inside pressure at 400 kg./cm.$^2$ and the residence time of the mixture in the reactor constant. The slurry comprising the ethylene-methanol mixture and polyethylene powder that was produced in the reactor was continuously taken out to the ambient space by passing it through the pressure-reduction circuit and introducing water as the flow rate controlling medium into the circuit at a flow rate of 1.5 liter/min. (FI-2).

It is possible to use methanol as the flow rate controlling medium, and this is advantageous because the separated methanol (containing about 1 percent by weight of ethylene at atmospheric pressure) can be used as a component of the reaction mixture or the flow rate controlling medium.

EXAMPLE 6

Pressure-reduction and flow rate control of a dichlorodifluoromethane-water system.

A high-pressure liquid-liquid system consisting of liquefied dichlorodifluoromethane and water (80:20 by weight) was subjected to pressure reduction in accordance with this invention. In the apparatus represented by the attached drawing, a 500 cc. autoclave equipped with an agitator was installed as the high-pressure vessel 1. Dichlorodifluoromethane (Freon-12) was charged into the autoclave at a rate of 2 kg./hr. by means of compressor 1.

At the same time, water was introduced into the high-pressure vessel 2 at a rate of 500 cc./hr. by means of a plunger pump having a capacity of 2 liter/hr. and a maximum operating pressure of 400 kg./cm.$^2$ (similar to the above-mentioned plunger pump 6 but not shown in the drawing). A 10 percent by weight aqueous solution of methanol as the flow rate controlling medium was passed through a tube 2 mm. in diameter and 20 m. in length at a flow rate of 1.8 liter/min. by means of pump 6 so that the pressure indicated by PI-2 might be kept at 50 kg./cm.$^2$. When the pressure indicated by PI-2 reacted 50 kg./cm.$^2$, valve V$_5$ was opened, the flow rate of the medium that was being supplied by means of pump 6 was reduced to 1.7 liter/min., and thus pressure reduction of the dichlorodifluoromethane-water mixture in the autoclave was effected.

It is impossible to reduce the pressure of this mixture by using only reducing valves, since the water is frozen by the adiabatic expansion of dichlorodifluoromethane.

TABLE 1

Pressure-Reduction and Flow Rate Control of Nitrogen

| Final Pressure | : | 0 kg./cm.$^2$ G |
|---|---|---|
| Medium | : | Water |
| Circuit 4 | : | 2 mm.φ×90 long tubing |
| Circuit 4a | : | not used |

Flow Rate

| Initial pressure (kg./cm.² G) | Gas flow rate (m.³(NTP)/hr.) | Flow Rate of medium (l./min.) |
| --- | --- | --- |
| (PI-1, 2) | (FI-1) | (FI-2) |
| 400 | 0 | 1.75 |
| 400 | 1.15 | 1.64 |
| 400 | 2.60 | 1.52 |
| 400 | 3.75 | 1.41 |
| 400 | 5.2 | 1.29 |
| 400 | 6.7 | 1.18 |
| 300 | 0 | 1.57 |
| 300 | 0.7 | 1.41 |
| 300 | 3.0 | 1.29 |
| 300 | 3.7 | 1.18 |
| 300 | 4.6 | 1.06 |
| 300 | 5.4 | 0.945 |
| 300 | 6.3 | 0.83 |
| 300 | 8.6 | 0.715 |
| 200 | 0 | 1.22 |
| 200 | 0.6 | 1.06 |
| 200 | 1.7 | 0.945 |
| 200 | 3.2 | 0.83 |
| 200 | 3.7 | 0.715 |
| 200 | 4.5 | 0.6 |
| 200 | 5.5 | 0.485 |
| 100 | 0 | 0.83 |
| 100 | 0.4 | 0.715 |
| 100 | 0.9 | 0.6 |
| 100 | 1.6 | 0.485 |

TABLE 2

Pressure Reduction and Flow Rate Control of Ethylene (Example 2)

| Final Pressure | : | 0 kg./cm.² G |
| --- | --- | --- |
| Medium | : | Methanol |
| Circuit 4 | : | 2 mm.φ×85 m. long tubing |
| Circuit 4a | : | 2 mm.φ×20 m. |

| Initial pressure (kf./cm.² G) | Gas flow rate (m.³(NTP)/hr.) | Flow Rate of medium (l./min.) |
| --- | --- | --- |
| (PI-1, 2) | (FI-1) | (FI-2) |
| 400 | 0 | 1.84 |
| 400 | 1.0 | 1.75 |
| 400 | 3.5 | 1.62 |
| 400 | 6.0 | 1.52 |
| 300 | 0 | 1.52 |
| 300 | 2.0 | 1.41 |
| 300 | 4.0 | 1.30 |
| 200 | 0 | 1.17 |
| 200 | 2.0 | 1.07 |
| 200 | 4.0 | 0.85 |
| 100 | 0 | 0.84 |
| 100 | 1.0 | 0.72 |
| 100 | 3.2 | 0.60 |
| 100 | 5.3 | 0.50 |

TABLE 3

Pressure Reduction and Flow Rate Control of $CO_2$ (Example 3)

| Final Pressure | : | 0 kg./cm.² G |
| --- | --- | --- |
| Medium | : | Methanol |
| Circuit 4 | : | 2 mm.φ×85 m. long tubing |
| Circuit 4a | : | 2 mm.φ×20 m. long tube |

| Initial pressure (kg./cm.² G) | Gas Flow rate (m.³(NTP)/hr.) | Flow Rate of medium (l./min.) |
| --- | --- | --- |
| (PI-1, 2) | (FI-1) | (FI-2) |
| 100 | 3.0 | 0.48 |
| 100 | 4.8 | 0.4 |
| 80 | 1.7 | 0.48 |
| 80 | 2.8 | 0.40 |
| 80 | 3.7 | 0.34 |
| 80 | 4.8 | 0.27 |

We claim:

1. A method of reducing the pressure in a high-pressure fluid system and controlling the flow rate of the fluid in said system by passing the fluid through a pressure-reduction circuit, comprising the steps of introducing a liquid flow rate controlling medium into said circuit, the medium being in the liquid state under the temperature and pressure conditions in the circuit, and regulating the flow rate of the liquid medium to reduce the flow rate of the fluid.

2. In the method of claim 1, the fluid being in a gaseous phase.

3. In the method of claim 1, the fluid being a two-phase gas-liquid system.

4. In the method of claim 1 the fluid being a slurry.

5. In the method of claim 1, the fluid being in a liquid phase consisting of at least two immiscible liquids.

6. In the method of claim 1, the fluid being a gas-liquid-solid system.

7. In the method of claim 1, the liquid medium being immiscible with the fluid.

8. In the method of claim 1, the fluid being a compressible gas and the pressure-reduction circuit being a long tubing.

9. In the method of claim 1, the fluid being a liquefied gas and the liquid medium is miscible with the liquefied gas.

10. In the method of claim 1, the fluid being a slurry comprising a liquefied gas and a powder material, the liquid medium is miscible with the liquefied gas, and the pressure-reduction circuit is a long tubing.

11. In the method of claim 9, the liquid medium being selected from the group consisting of water, methanol and mixtures thereof.

12. In the method of claim 11, the slurry comprising ethylene, methanol and polyethylene powder, and the liquid medium being methanol.

13. In the method of claim 1, the fluid being selected from the group consisting of ethylene, nitrogen, carbon dioxide, an ethylene-polyethylene slurry, an ethylene-methanol-polyethylene powder slurry, and a dichlorodifluoromethane-water mixture.

14. In the method of claim 1, the fluid being a mixture of a polymerization product and unreacted residues being conducted through a pressure-reducing circuit out of a high-pressure reactor in which at least one monomer is polymerized under high pressure.

15. In the method of claim 14, wherein the mixture comprises the polymerization product, at least one unreacted monomer, and a polymerization medium.

16. In the method of claim 14, wherein the polymerization product is polyethylene.

* * * * *